United States Patent [19]
Tsukamoto et al.

[11] Patent Number: 5,881,858
[45] Date of Patent: Mar. 16, 1999

[54] HYDRAULIC SERVO-MECHANISM FOR AN AUTOMATIC TRANSMISSION

[75] Inventors: Kazumasa Tsukamoto, Toyota; Masahiro Hayabuchi; Masaaki Nishida, both of Anjo; Akitoshi Kato, Takahama; Katsuyuki Tanahashi, Okazaki, all of Japan

[73] Assignee: Aisin AW Co., Ltd., Japan

[21] Appl. No.: 777,179

[22] Filed: Dec. 27, 1996

[30] Foreign Application Priority Data

Feb. 9, 1996 [JP] Japan ..................................... 8-046940

[51] Int. Cl.⁶ ..................................................... F16D 49/12
[52] U.S. Cl. ............................. 192/86; 92/63; 188/77 W; 188/347
[58] Field of Search ........................... 92/63, 65; 475/271, 475/128; 477/127; 188/77 W, 347, 151 R; 192/80, 86; 91/167 R

[56] References Cited

U.S. PATENT DOCUMENTS

| | | | |
|---|---|---|---|
| 2,227,245 | 12/1940 | Carroll | 188/152 |
| 2,513,192 | 6/1950 | McFarland | 188/151 R |
| 2,633,712 | 4/1953 | Sheppard | 91/167 R |
| 2,769,307 | 11/1956 | McFarland | 188/151 R |
| 4,388,986 | 6/1983 | Umezawa | 92/65 X |
| 4,601,233 | 7/1986 | Sugano | 92/63 X |
| 4,787,494 | 11/1988 | Ogasawara et al. | 192/86 |
| 4,790,211 | 12/1988 | Iwatsuki et al. | 475/86 |
| 4,930,373 | 6/1990 | Nakawaki et al. | 475/128 |
| 5,020,393 | 6/1991 | Kuwayama et al. | 475/128 X |
| 5,588,928 | 12/1996 | Koivunen | 475/128 X |
| 5,711,403 | 1/1998 | Sparks et al. | 188/77 W |

*Primary Examiner*—Rodney H. Bonck
*Attorney, Agent, or Firm*—Lorusso & Loud

[57] ABSTRACT

A hydraulic servo-mechanism for an automatic transmission, including a hydraulic servo for applying a band brake to engage a band to a drum. The hydraulic servo includes a rod which is selectively positionable to an apply position for applying the band brake, a standby position in which the rod is retracted by a predetermined extent in a release direction from the apply position, and a retracted position in which the rod is further retracted in the release direction from the standby position to release the band brake.

9 Claims, 5 Drawing Sheets

FIG. 2

|      | A | B | C |
|------|---|---|---|
| 1ST  |   |   | ○ |
| 2ND  |   |   |   |
| 3RD  |   | ○ |   |
| 4TH  | ○ |   |   |

HYDRAULIC SERVO-MECHANISM FOR AN AUTOMATIC TRANSMISSION

BACKGROUND OF THE INVENTION

1. Field of the Invention

The present invention relates to a band brake for an automatic transmission and, more particularly, to a hydraulic servo-mechanism for engaging a brake band to a drum so as to apply the band brake.

2. Related Art

Band brakes have long been used in automatic transmissions as one mode of an engaging element for fixing a specific speed change element on a transmission case to change a gear stage. In the prior art, a hydraulic servo-mechanism for fastening the brake band of the band brake on the drum applies/releases the brake by moving its rod between two positions, i.e., an apply position and a release position. Such a hydraulic servo-mechanism is disclosed, for example, in U.S. Pat. No. 4,787,494.

The band brake, as arranged in the case of the automatic transmission, is held in an oil-lubricated state together with other elements in the case, so that at the brake-releasing time the oil existing in the gap between the brake band and the drum is dragged by the rotation of the drum causing a dragging loss. To reduce this loss, attempts have been made to increase the clearance between the band and the drum at the brake releasing time to such a level as to cause no dragging resistance. When this is done, however, the rod of the hydraulic servo for applying the brake has to be displaced by a large stroke at the brake applying time, resulting in a deterioration of the response for the brake application.

SUMMARY OF THE INVENTION

It is, therefore, an object of the present invention to provide a hydraulic servo-mechanism for an automatic transmission, which is enabled to reduce the dragging loss at a brake releasing time without deteriorating the response at the brake applying time, by making it possible to selectively set the operational positions of a hydraulic servo.

Another object of the present invention is to optimize the setting of the operational positions of the hydraulic servo for the application thereby to prevent the drop in the application response at a shifting time, by determining the selective setting of the operational positions of the hydraulic servo in the shifting order of the gear stages of the transmission.

Another object of the present invention is to reduce dragging loss for improving mileage by setting the operational position of the hydraulic servo, as making the reduction in the dragging loss at the brake releasing time, to the higher gear stage.

Yet another object of the present invention is to shift the rod of the hydraulic servo reliably to each of the set positions to be selected, merely by supplying oil pressures oppositely to the hydraulic servo.

Still another object of the present invention is to reduce application shocks of the band brake while achieving the above-specified individual objects.

A further object of the present invention is to effect the shift of the rod of the hydraulic servo to the retracted position by a simple circuit construction in accordance with the gear stages of the transmission.

A further object of the present invention to prevent a drop in the application response at a skip shift, by setting the operational positions of the hydraulic servo selectively in accordance with the skip shift.

A further object of the present invention to make a reduction in dragging loss more effective by holding the clearance satisfactory at the brake releasing time.

A further object of the present invention is to prevent interference between the band and the drum, as might otherwise be caused by the vibrations or the like, at the time of releasing the band brake.

These and other objects of the present invention will become apparent from a review of the description provided below. According to the present invention, there is provided a hydraulic servo-mechanism for an automatic transmission, which mechanism -includes a hydraulic servo for applying a band brake to engage a band to a drum. The hydraulic servo includes a rod which is selectively positioned in an apply position for applying the band brake, a standby position in which the rod is retracted by a predetermined extent in a release direction from the apply position, and a retracted position in which the rod is further retracted in the release direction from the standby position to release the band brake. The automatic transmission achieves at least a first gear stage by applying the band brake, a second gear stage close to the first gear stage, and a third gear stage interposing the second gear stage between itself and the first gear stage. Preferably, the third gear stage corresponds to a higher vehicle speed than the first and second gear stages. The rod of the hydraulic servo is set to the apply position for establishing the first gear stage, the standby position at the second gear stage, and the retracted position at the third gear stage.

The band is restrained at one end by an anchor pin and expanded by its own elasticity when the rod is in the retracted position. The case of the automatic transmission has a support face for supporting the outer circumference of the band over a predetermined range thereby to restrict the expansion of the band. The support face supports the band in the expanded state for establishing a predetermined gap between an apply side bracket of the band and a leading end portion of the rod when the rod is in the retracted position.

The hydraulic servo has an apply oil chamber to be supplied with the oil pressure for pushing the rod in an apply direction, and a return oil chamber to be supplied with an oil pressure for pushing in the release direction. The rod is set to the apply position by supplying the oil pressure to the apply oil chamber, the standby position by releasing the oil pressure from the return oil chamber and the apply oil chamber, and the retracted position by supplying the oil pressure to the return oil chamber.

Preferably, the hydraulic servo includes a first piston fixed immovably on the rod and fitted movably in the cylinder of the hydraulic servo. The return oil chamber is defined between the first piston and the cylinder. A second piston is supported by the rod slidably in the axial direction only by a predetermined extent, and is fitted movably in the cylinder. The apply oil chamber is defined between the second piston and the cylinder. A separate spring is provided for separating the first piston and the second piston axially from each other, and a return spring is provided for urging the second piston in the release direction.

In one embodiment, the oil pressure to be supplied to the return oil chamber is one for another hydraulic servo acting as an engaging element to be applied for establishing the third gear stage. In another embodiment, the return oil chamber and the other hydraulic servo acting as the engaging element to be applied for establishing the third gear stage are connected through an oil passage. A valve is arranged in the oil passage for blocking the oil passage when the throttle opening of an engine connected to the automatic transmission exceeds a predetermined value.

BRIEF DESCRIPTION OF THE DRAWINGS

A preferred embodiment of the invention is described below with reference to the following figures wherein like numerals represent like parts:

FIG. 2 is a diagram tabulating the operations of a preferred hydraulic servo according to the invention for establishing various gear stages;

DESCRIPTION OF THE PREFERRED EMBODIMENTS

The present invention will now be described in connection with the accompanying drawings.

Figure 1:
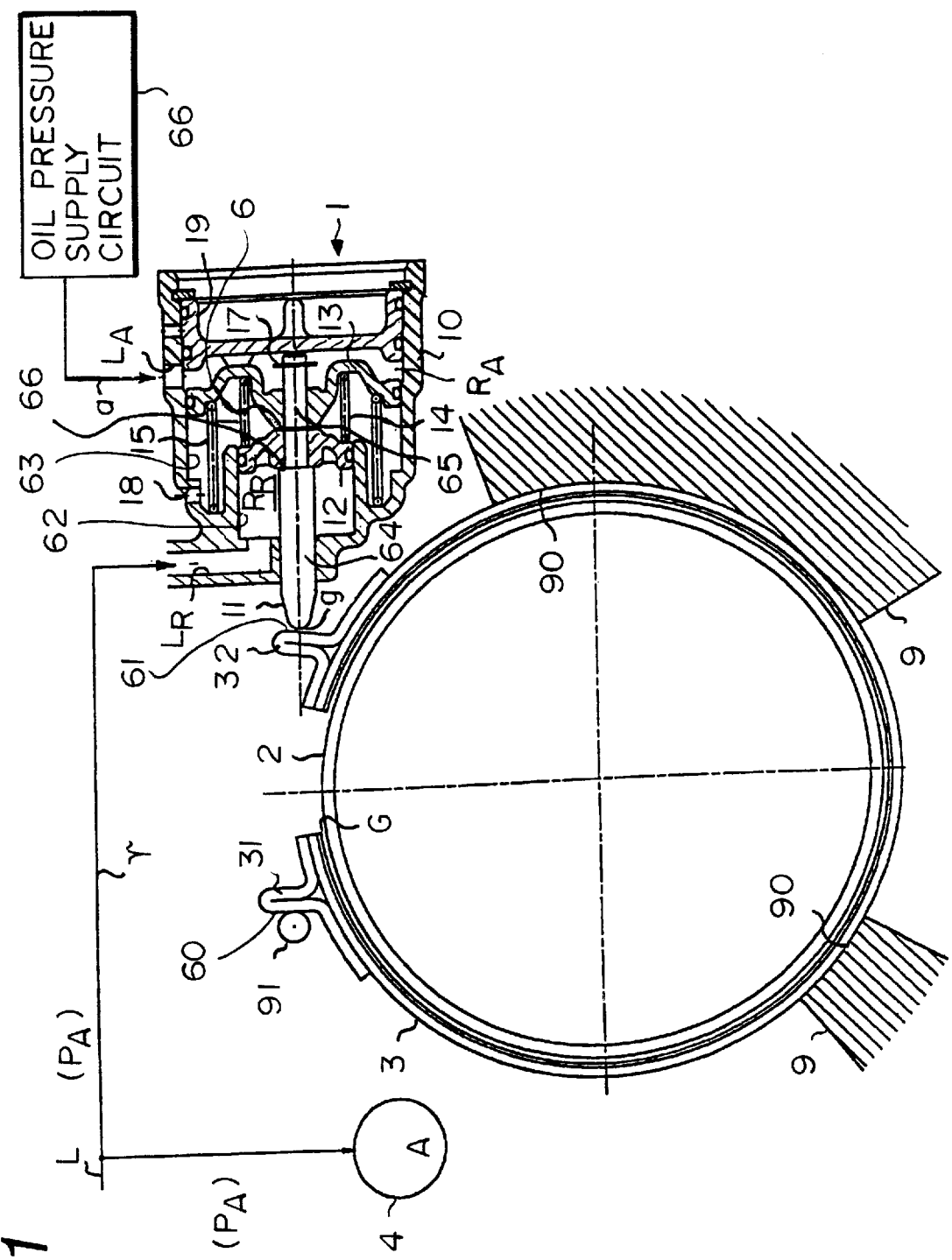
FIG. 1 is a side sectional view showing the hydraulic servo and the engaging elements of a hydraulic servo-mechanism according to the present invention in connection with their related circuit portions.
Figure 2:
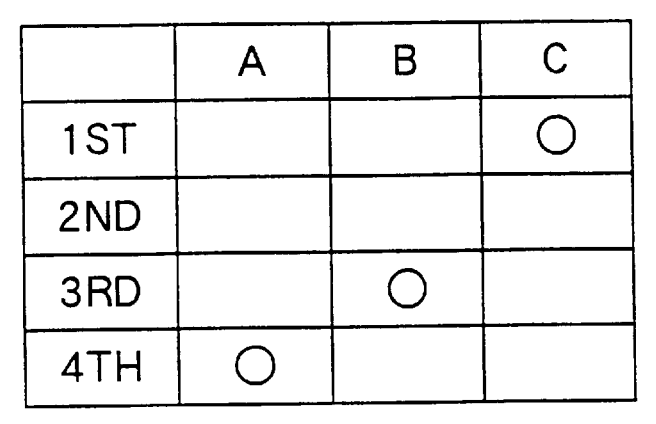
Figure 3:
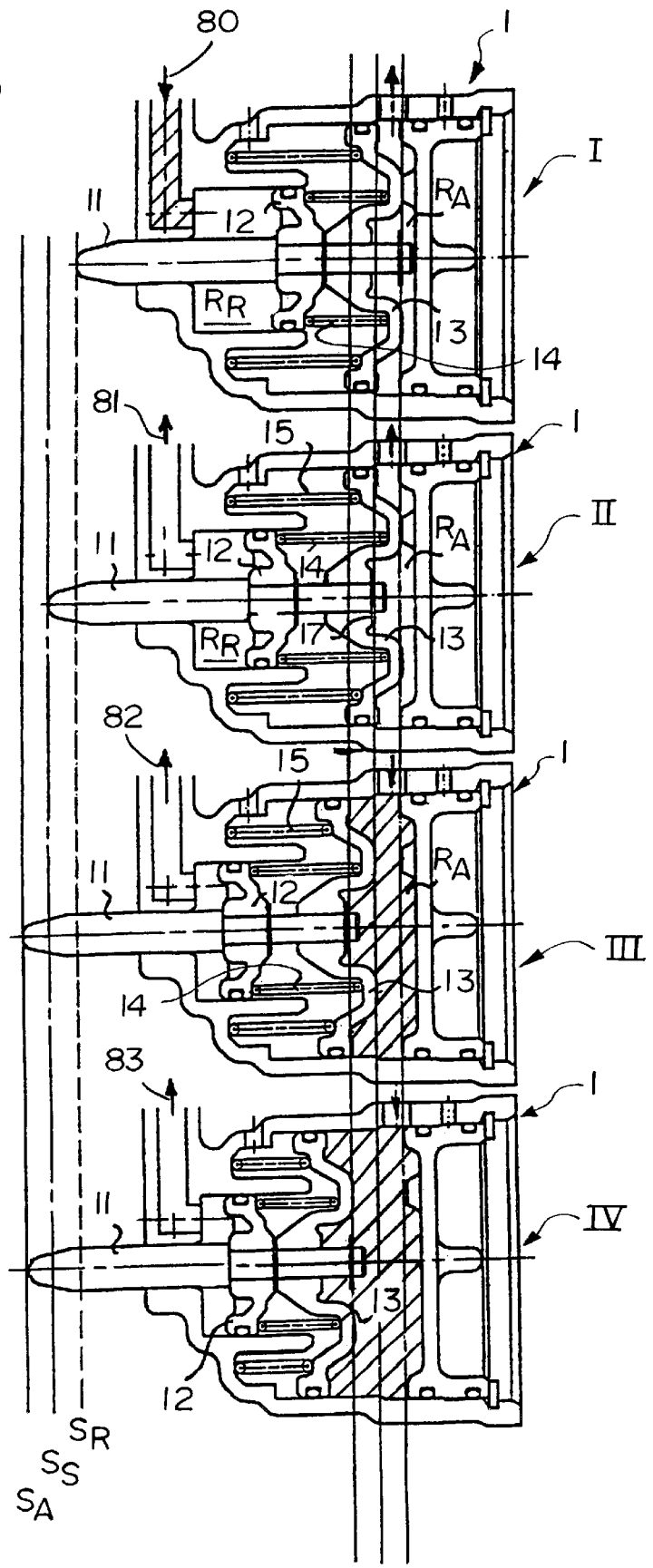
FIG. 3 is an application diagram showing the relations between the operations of the hydraulic servo-mechanism according to the invention and the gear stages to be established.

FIGS. 1 to 3 show a first embodiment of the present invention. With reference to FIG. 1, the hydraulic servo-mechanism of the first embodiment includes: a drum 2 composing an engagement element of a band brake, a band 3 to be fastened on the drum 2; a hydraulic servo 1 constructing an operation mechanism therefor; and a circuit for controlling the hydraulic servo 1.

The drum 2 of the band brake is connected to a suitable component that the individual components, e.g., the sun gears, ring gears, and carriers of a plurality of planetary gears, of an automatic transmission gear train may be fixed for a speed change to an automatic transmission case 9 so as to act as the reaction components. The band 3 is arranged around substantially all the circumference of the drum 2. The band 3 includes an anchor side bracket 31 having a angular section attached to one end of the outer circumference of the band 3, and an apply side bracket 32 having a similar angular section attached to the other end of the outer circumference. An anchor pin 91 anchored to the automatic transmission case 9 is applied to the sectional crest 60 of the anchor side bracket 31. The hydraulic servo 1, as fixed on the automatic transmission case 9, is positioned to confront the sectional crest 61 of the apply side bracket 32.

The hydraulic servo 1 is made separate from the automatic transmission case 9 in the present embodiment, and is constructed to include: a cylinder 10 mounted on the case 9 by suitable means; first and second pistons 12 and 13 arranged in the cylinder 10; and a rod 11 inserted into the two pistons. The cylinder 10 is formed into a bottomed cylindrical shape, and a stepped bore is formed to have a smaller diameter at the bottom side and a larger diameter at the open end side. The first piston 12 is slidably fitted in the smaller-diameter bore 62, and the second piston 13 is slidably fitted in the larger-diameter bore 63. The axis of the cylinder 10 is fixed in the tangential direction of the drum 2. The open end side is closed oil-tight by a plug 19 which is fitted in the larger-diameter bore 63. Between the first piston 12 and the second piston 13, there is arranged a separate spring 14 which is biased by a predetermined initial load. Between the second piston 13 and the bottom wall of the cylinder 10, there is arranged a return spring 15 which is biased by a predetermined initial load.

The rod 11 of the hydraulic servo 1 is a stepped cylinder having large and smaller diameter portions 64,65. The rod 11 is slidably supported by the cylinder 10 through the two pistons 12 and 13 by fitting the larger-diameter portion 64 of the rod in the hole of the cylinder bottom wall and by fitting the smaller-diameter portion 65 of the rod in the center bore of the first piston 12 and the center bore of the second piston 13. The first piston 12 is axially immovably fixed on the rod 11 by having its one end face in abutment against the stepped portion 66 of the rod 11 and its other end face in abutment against a washer 16 fixed on the rod 11. The second piston 13 is slidably fitted on the smaller-diameter portion 65 of the rod 11, and is given a predetermined stroke within a range to abut against either a snap ring 17, which is fitted in the groove of the end portion of the smaller-diameter portion of the rod 11, or the aforementioned washer 16. The snap ring 17 and the washer 16 act as stoppers at opposite ends of the piston stroke. The end of the larger-diameter portion of the rod 11 is formed into a spherical shape to abut against the crest 61 of the apply side bracket 32.

The smaller-diameter bore 62 of the cylinder 10 and a return oil chamber $R_R$ as defined by the first piston 12, are connected by an oil passage $L_R$ formed in the cylinder bottom wall by way of an oil passage r with a supply circuit L for supplying the oil pressure to the hydraulic servo of another engaging element A. The larger-diameter bore 63 of the cylinder 10 and an apply oil chamber $R_A$ as defined by the plug 19 and the second piston 13, is connected through a port $L_A$ in the cylinder circumference by way of an oil passage and with an oil pressure supply circuit 66 for the hydraulic servo 1. The larger-diameter of the cylinder 10 and the return spring arranging space, as defined by the first and second pistons 12 and 13, are vented to a space in the transmission case 9 by a breather hole 18 formed in the circumferential wall of the cylinder 10.

In the hydraulic servo-mechanism thus constructed, the individual gear stages 1ST, 2ND, 3RD and 4TH of 1st to 4th speeds are achieved by supplying/releasing oil pressure to the hydraulic servos corresponding to the individual engaging elements under the control of a hydraulic control system (not shown) including the aforementioned supply circuit. For example, in the preferred embodiment, each gear stage is achieved by applying (as indicated by symbols O) and releasing (as indicated by no sign) the individual engaging elements A, B and C, as tabulated in FIG. 2. In FIGS. 1 and 2, the engaging element A, corresponds to the engaging element to be applied for achieving the 4th speed (4TH), and the band brake shown in FIG. 1 corresponds to the engaging element C to be applied for achieving the 1st speed (1ST).

From the relations between the individual engaging elements and the hydraulic circuit, the engaging element A is applied when an apply pressure ($P_A$) is supplied from the supply circuit L to the hydraulic servo 4 of the engaging element A, as shown in FIG. 1, to achieve the 4th speed (4TH). This oil pressure is $P_A$ is also supplied by way of the oil passage R and the release oil passage $L_R$ to the return oil chamber $R_R$ of the hydraulic servo 1 so that the first piston 12 is pushed back by that pressure while compressing the separate spring 14 thereby to push back the rod 11 fixed thereon to the shown retracted position. As a result, the band 3 is radially enlarged following the retraction of the rod 11 by its own expanding force thereby to enlarge a clearance G from the drum 2 to a width (e.g., about 1 mm) sufficient for establishing no dragging resistance of the oil. In the present embodiment, when the band 3 reaches a predetermined radially enlarged state, the outer circumference of the band 3 is supported at its one end abutting against the anchor pin 91, and by two support faces 90 of the case 9 at its substantially equal-distant portions in the circumferential direction so that the clearance G for the drum 2 is substantially equalized over the circumference. Moreover, since the radial expansion of the band 3 is stopped by the support of the case 9, a gap g is established between the leading end of the rod 11 and the apply side bracket 32 by the further retraction of the rod 11. The establishment of this gap g is effective for preventing unintentional brake application due to vibrations or the like.

At the time of a shift to the 3rd speed or a downshift from the 4th speed, the apply pressure of the hydraulic servo 4 is released, and the oil pressure, as supplied to the return oil chamber $R_R$ of the hydraulic servo 1, is also released via the release oil passage $L_R$. As a result, the first piston 12 is released from its received pressure and is pushed out by the load of the separate spring 14 so that the rod 11 fixed thereon is returned to a standby position. The band 3 is radially reduced by the push of the rod against its own expanding force to reduce the clearance G to the value (e.g., about 0.5 mm) corresponding to the released state of the prior art so that it comes to the standby position for the shift to the 1st speed. At the time of a shift-up from the 2nd speed, on the other hand, the oil pressure is not originally supplied to the supply circuit L so that the first piston is pushed to the standby position by the load of the separate spring 14.

The operation of the shift to the 1st speed is similar to that of the hydraulic servo of the prior art. Here will be described in more detail the relations between the supply/release of the oil pressure of the hydraulic servo 1 and the accompanying displacements of the first and second pistons 12 and 13 and the rod 11, as well as the aforementioned operations intrinsic to the construction of the present invention.

With reference to FIG. 3, there is shown a side-by-side comparison of the operational stages of the hydraulic servo 1. The state, as shown in the uppermost stage I. of FIG. 3, illustrates the retracted position of the rod 11. The oil pressure is supplied (as indicated by the downward arrow 80) only to the return oil chamber $R_R$. In this state, both the first and second pistons 12 and 13 are in the most retracted position with respect to the band, and the rod 11 is also in the retracted position with respect to the second piston 13. At this time, the separate spring 14 is also compressed. This state is the aforementioned retracted position of the rod 11, as indicated by $S_R$ in FIG. 3.

When the oil pressure in the oil chamber $R_R$ is released (as indicated by upward arrow 81) from this state so that both the oil pressures in the two oil chambers $R_R$ and $R_A$ disappear, as shown at the second stage II of FIG. 3, the second piston 13 is held in the aforementioned position by the load of the return spring 15. The first piston 12 is pushed out by the load of the separate spring 14 so that the rod 11 fixed thereon is also pushed out. Moreover, the snap ring 17 at the rear end of the rod 11 has its stroke restricted to stop its displacement when it comes into abutment against the second piston 13. This state is the aforementioned standby position of the rod 11, as indicated by $S_S$, in FIG. 3.

The third stage III of FIG. 3 occurs when the oil chamber $R_A$ is supplied with oil pressure. The second piston 13 advances while compressing the return spring 15 until the band comes into engagement with the drum to stop the advance of the rod 11. At this time, the rod 11, the first piston 12, and the second piston 13 are displaced exclusively in their positions while leaving all their relative positional relations and the compressed state of the separate spring 14 similar to those of the standby state. When the band comes into contact with the drum to eliminate the clearance G (as shown in FIG. 1) thereby to stop the advance of the rod 11, the second piston 13 then continues its further advance while compressing the separate spring 14. The reaction load by the compression of the separate spring 14 through the first piston 12 is applied to the rod 11 so that the force, as damped by the spring elasticity of the spring 14, is applied to the band thereby to provide an effect to damp the shocks at the beginning of the brake application.

When the second piston 13 advances to abut against the first piston 12, as indicated at the lowermost stage IV of FIG. 3, the pushing force by the oil pressure applied to the second piston 13 is applied directly to the rod 11 through the first piston 12 so that the band performs its intrinsic brake application to clamp the drum by the strong force. This state is the aforementioned apply position for the rod 11, as indicated by $S_A$ in FIG. 3.

In the embodiment thus far described, the automatic transmission is enabled to achieve the 1st speed, i.e. the first gear stage to be established, by applying the band brake, the 2nd speed, i.e. the second gear stage close to the first gear stage, and the 4th speed, i.e. the third gear stage interposing the 2nd speed between itself and the 1st speed and higher than the 1st and 2nd speeds. The rod 11 of the hydraulic servo is set to the apply position for establishing the 1st speed, to the standby position at the 2nd speed, and to the retracted position at the 4th speed. For these settings, moreover, the hydraulic servo 1 is constructed to have the apply oil chamber $R_A$ to be supplied with the oil pressure for pushing the rod 11 in the apply direction, and the return oil chamber $R_R$ to be fed with the oil pressure for pushing the same in the release direction. As a result, the rod 11 is set to the apply position by supplying the oil pressure to the apply oil chamber $R_A$, to the standby position by releasing the oil pressure from the return oil chamber $R_R$ and the apply oil chamber $R_A$, and to the retracted position by supplying the oil pressure to the return oil chamber $R_R$.

More specifically, the hydraulic servo 1 is constructed to include: the first piston 12 fixed immovably on the rod 11 and fitted movably in the cylinder 10 of the hydraulic servo 1; the second piston 13 supported by the rod 11 to slide axially by a predetermined extend and fitted movably in the cylinder for defining the apply oil chamber $R_A$ with the cylinder 10; the separate spring 14 for separating those pistons in the axial direction from each other; and the return spring 15 for urging the second piston 13 in the release direction. Moreover, the oil pressure to be supplied to the return oil chamber $R_R$ is that of the other hydraulic servo 4 for the engaging element A to be applied for achieving the 4th speed.

Thus, according to the first embodiment described above, with the band brake being released, the selection can be made between the standby position, in which the rod 11 is not relatively retracted, and the retracted position, in which the rod 11 is largely retracted, so that the rod is set in advance in the standby position when the band brake may probably be applied, to cause no drop in the application response. When the probability of the application is low enough to exert no influence upon the application response, the dragging loss can be reduced by setting the rod in the retracted position in which the rod is located at the back of the standby position. Specifically, at the 2nd speed close to the 1st speed, the shift is highly probably made to the 1st speed to apply the brake, and at the 3rd or 4th speed, the shift is made to the 1st speed ordinarily through the 2nd speed. By setting the 2nd speed to the standby position, therefore, the state of high probability of application can be easily discriminated without any use of special detection means, so that the drop in the application response can be prevented without fail. At a high-speed stage, moreover, the running frequency is high, and the influence upon the mileage due to the dragging loss is also high so that the mileage can be effectively improved by setting the rod 11 at the release position at the high-speed stage. By employing the application pressure for the other engaging element as the release pressure, on the other hand, the position of the rod 11 is changed so that the hydraulic servo-mechanism can be given a compact construction by the simple circuit construction.

Figure 4:
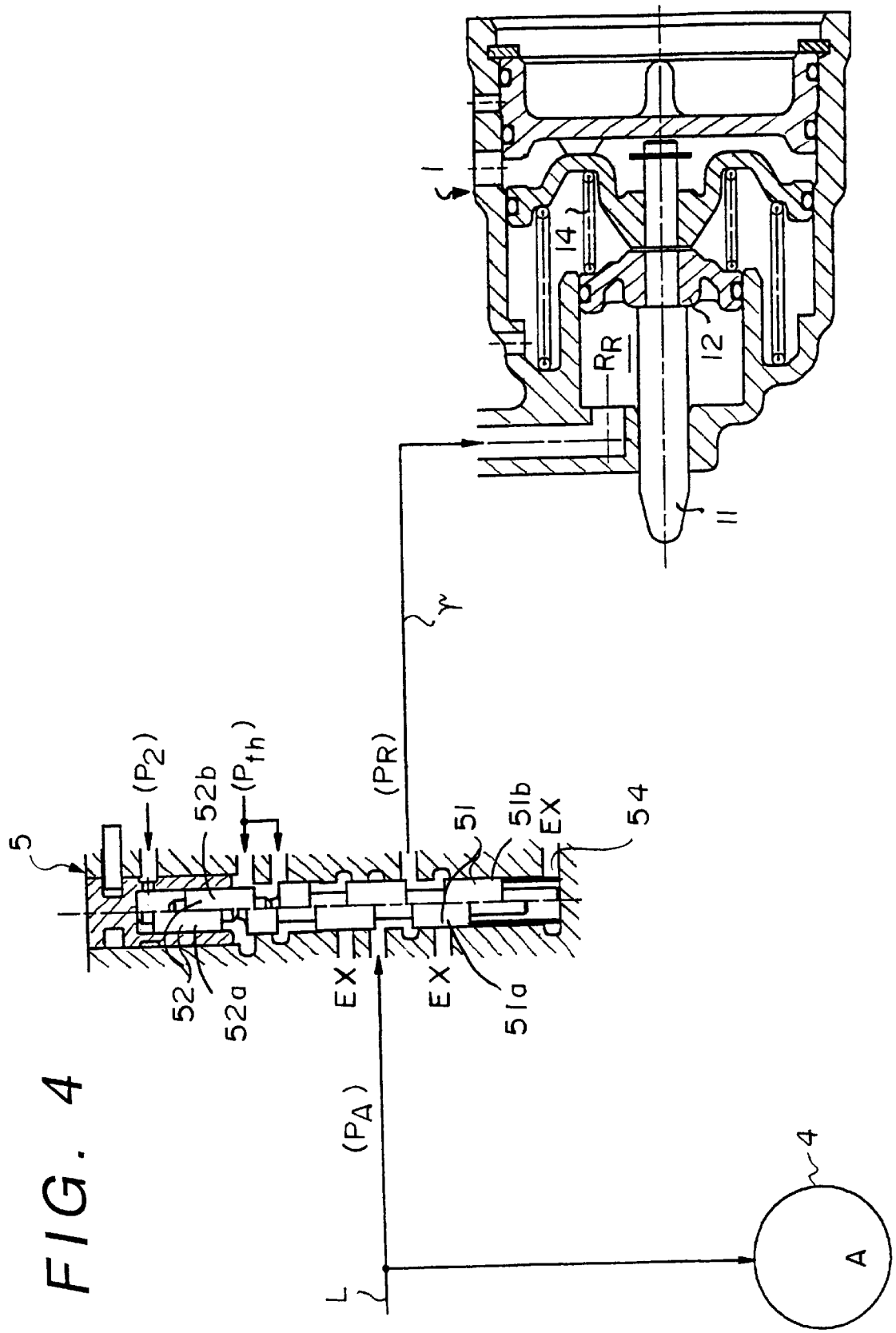
FIG. 4 is a circuit diagram showing a portion of the circuit construction of a hydraulic servo-mechanism according to a second embodiment of the present invention together with the section of the hydraulic servo.

Turning now to FIG. 4, there is shown a second embodiment of the present invention. This embodiment is similar to the foregoing first embodiment in that the rod is retracted at the 4th speed, but is different in that the rod is returned to the standby position for making preparations for the kick-down of the driver of the vehicle. This difference will be exclusively described in the following.

A change-over valve 5 is disposed in the oil passage r. This change-over valve 5 is a spring return type valve, and includes: a spool 51 for switching the connection of the release oil passage r with the drain by providing/blocking the communication of the supply circuit L with the release oil passage r; and a plunger 52 for causing the spool 51 to switch, as described above. For ease of comparison, the change over valve 5 is shown in FIG. 4 with the spool 51 and the plunger 52 in two different positions divided through the center of the valve. On the left-most side of the valve, the spool 51a and plunger 52a are shown in an oil passage connected state. On the right-most side of the valve, the spool 51b and plunger 52b are shown in a release oil passage connected state. The plunger 52 can be supplied with a 2-range (or second range) pressure ($P_2$) of the hydraulic circuit to set the hydraulic servo 1 in the standby position at the 2nd speed establishing time. The spool 51 can be supplied irrespective of its position with a throttle pressure ($P_{th}$).

When the apply oil is supplied to the hydraulic servo 4 of the engaging element A so as to establish the 4th speed from the relation between the engaging elements and the hydraulic circuit, it is also supplied from the supply circuit L to the change-over valve 5. At this time, the change-over valve 5 is held in the oil passage connected state, as shown at the left-hand half in FIG. 4, by the spring load. The apply pressure ($P_A$) is supplied as the release pressure ($P_R$) through the change-over valve 5 to the return oil chamber $R_R$ of the hydraulic servo 1, and is received by the first piston 12 to push back the rod 11 fixed thereon to the retracted position, as shown. As a result, the band is 3 (FIG. 1) expanded following the retraction of the rod 11 by its own expanding force, thereby to expand the clearance from the drum to such a size sufficient for causing no dragging resistance of the oil.

If the driver performs the kick-down in this state, the throttle pressure ($P_{th}$) is output from a throttle valve (not shown) of the hydraulic circuit so that the spool 51 of the change-over valve 5 is switched to the position, as indicated at the right-hand half of FIG. 4, to close the supply circuit L and to connect the release oil passage to the drain 54. As a result, the oil pressure of the return oil chamber $R_R$ is released so that the first piston 12 is pushed out by the load of the separate spring 14 to bring the rod 11 into the standby position.

Thus, in this embodiment, the 4th speed (4TH) or the third gear stage is set at a higher side than the 1st speed (1ST) or the first gear stage and the 2nd speed (2ND) or the second gear stage, and the return oil chamber $R_R$ is connected via the oil passage r to the other hydraulic servo 4 for the engaging element A to be applied for establishing the 3rd gear stage (4TH). In this oil passage r, there is arranged the valve 5 for blocking the oil passage r when the throttle opening exceeds a predetermined value. With this construction, the drop in the application response at the time of a shift bypassing the 2nd speed can be prevented by releasing the oil pressure of the return oil chamber $R_R$ in advance when the throttle opening is so large as to anticipate a skip shift by the kick-down.

Figure 5:
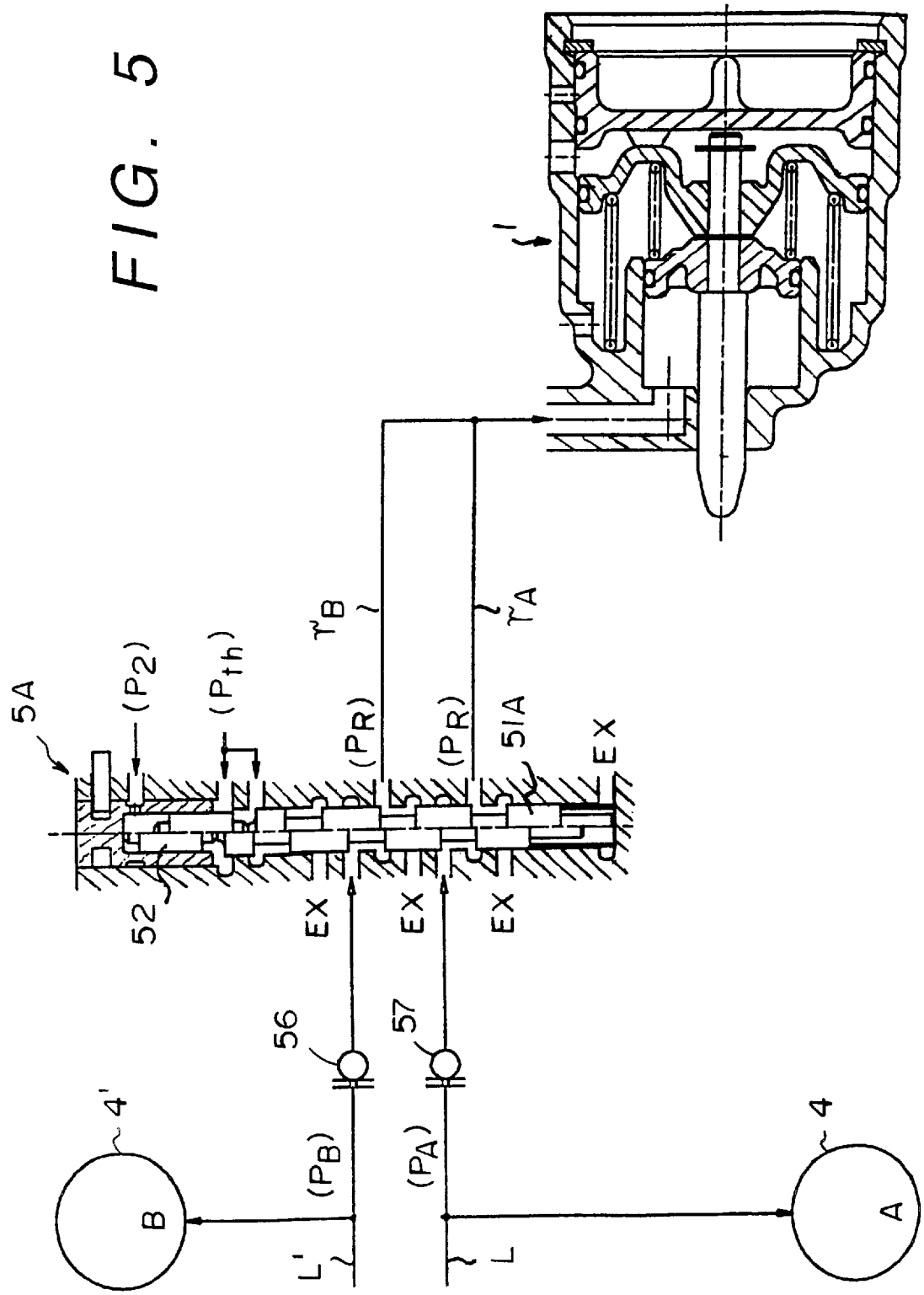
FIG. 5 is a circuit diagram showing a portion of the circuit construction of a hydraulic servo-mechanism according to the third embodiment of the present invention together with a section of the hydraulic servo.

FIG. 5 shows a third embodiment of the present invention. This embodiment is similar to the foregoing second embodiment in that the rod is returned to the standby position to make preparations for the kick-down operation but is different from any of the foregoing embodiments in that the rod is also retracted at the 3rd speed. In FIG. 5, for ease of comparison, the spool and plunger are shown in one position on the left-most side of the valve 5, and in another position on the right-most side of the valve.

In the third embodiment, both the supply circuits L and L' of the engaging elements A and B are switched according to the aforementioned operator of the present invention. Preferably, two check valves 56, 57, are provided for preventing communication between the two hydraulic servos 4 and 4'.

In this construction, by setting the hydraulic servo 1 of the brake in the retracted position at the 4th speed (4TH) and at the 3rd speed (3RD), the time period for setting the standby position for causing the dragging loss can be limited to the minimum. A brake application can therefore be achieved in quick response to a shift which skips an intermediate gear stage such as the kick-down shift. In this embodiment, the 4th speed (4TH) and the 3rd speed (3RD) correspond to the third gear stage of the present invention.

Although the individual features of the present invention have thus far been described in connection with the three embodiments which are made by combining them in the imagined suitable modes, the present invention should not be limited to the exemplified specific constructions but can adopt the various specific constructions within the scope of the individual claims. In the individual embodiments, moreover, the present invention is applied to the single-wound band brake but could be applied to the structure in which the band is doubly wound on the drum. In this modification, the retraction stroke required for the rod of the hydraulic servo is about two times as large as that of the single-wound band brake in order to establish the predetermined clearance between the drum and the band. Therefore, the effect of the rod retraction by applying the present invention becomes far more prominent.

In the present invention thus constructed, in the unapplied state of the band brake, the rod can be selectively set to the standby position, in which it is less retracted, and the retracted position in which it is more retracted. As a result, if the rod is set in advance in the standby position when the probability of application of the band brake is high, the application response is not dropped. If the rod is set to the retracted position in which it is more retracted than the standby position when the probability of the application is low, the dragging loss can be reduced. By thus setting the rod position in accordance with the application probability, the dragging loss at the releasing time can be reduced as much as possible without lowering the application response.

Moreover, the speed change may probably be made to the first gear stage at the time of establishing the second gear stage close to the first gear stage, and the shift is ordinarily made to the first gear stage through the second gear stage at the time of establishing the third gear stage. As a result, the state of high probability of application can be easily discriminated by causing the set position of the rod of the hydraulic servo to each gear stage, and the reduction of the application response can be reliably prevented by holding the rod in the standby position at the time of establishing the second gear stage. In addition, mileage can be effectively improved by setting the rod to the released position at a high gear stage in which the influence of the dragging loss upon the mileage is serious.

The rod setting position can be altered merely by supplying the oil pressure selectively in the opposite direction to the hydraulic servo, so that hydraulic servo can be given a simple and compact construction. The pushing force to be applied to the rod of the hydraulic servo in the brake applying direction can be damped to the brake applying force by the separate spring so that the application shocks can be reduced without any special control of the oil pressure to be fed to the hydraulic servo. The rod can be set to the retracted position by the simple circuit construction. When the throttle opening is large enough for causing the skip shift by the kick-down, the oil pressure of the return oil chamber is quickly released irrespective of the gear stage position to set the rod of the hydraulic servo to the standby position, so that the drop in the application response can be prevented.

Also, by supporting the band on the anchor pin and the case by its own expanding force at the time of releasing the band brake, the band can be held, even if deformed, at a uniform clearance all over the circumference from the drum. At the band brake releasing time, the predetermined gap is established between the apply side bracket and the leading end portion of the rod of the hydraulic servo so that the band is supported on the anchor pin and the case by the sufficient holding force of its own expanding force without being obstructed by the leading end portion of the rod. Thus no interference is cause between the band and the drum by the vibrations or the like.

The embodiments which have been described herein are but some of the several which utilize this invention, and are set forth here by way of illustration, but not of limitation. It is obvious that many other embodiments which will be readily apparent to those skilled in the art may be made without materially departing from the spirit and slope of the invention.

What is claimed is:

1. A hydraulic servo-mechanism for an automatic transmission of a vehicle, comprising a hydraulic servo for applying a band brake to engage a band of said band brake to a drum, wherein the band has an apply side bracket and wherein said hydraulic servo includes a rod, means for selectively positioning and holding said rod in one of plural positions including an apply position for applying said band brake, a standby position in which said rod is retracted by a predetermined extent in a release direction from said apply position, and a retracted position in which said rod is further retracted in the release direction from said standby position to release said band brake, said rod abutting said apply side bracket at least in said standby and apply positions.

2. A hydraulic servo-mechanism according to claim 1, wherein application of said band brake achieves, for the automatic transmission, at least a first gear stage, a second gear stage close to said first gear stage, and a third gear stage interposing said second gear stage between itself and said first gear stage, and wherein the rod of said hydraulic servo is set to said apply position for establishing said first gear stage, said standby position at said second gear stage, and said retracted position at said third gear stage.

3. A hydraulic servo-mechanism according to claim 2, wherein said hydraulic servo has an apply oil chamber for receiving a first oil pressure for pushing said rod in an apply direction, and a return oil chamber for receiving a second oil pressure for pushing said rod in the release direction, and wherein said rod is set to the apply position by supplying said first oil pressure to the apply oil chamber, said standby position by releasing said second oil pressure from said return oil chamber and said first oil pressure from said apply oil chamber, and said retracted position by supplying said second oil pressure to said return oil chamber.

4. A hydraulic servo-mechanism according to claim 3, wherein said hydraulic servo includes:

a first piston fixed immovably on said rod and fitted movably in a cylinder of said hydraulic servo, said return oil chamber being defined between said first piston and said cylinder;

a second piston supported by said rod slidably in an axial direction with respect to said rod only by a predetermined extent and fitted movably in said cylinder, said apply oil chamber being defined between said second piston and said cylinder;

a separate spring for separating said first piston and said second piston axially from each other; and a return spring for urging said second piston in the release direction.

5. A hydraulic servo-mechanism according to claim 4, wherein said second oil pressure is an oil pressure for another hydraulic servo acting as an engaging element to be applied for establishing said third gear stage.

6. A hydraulic servo-mechanism according to claim 5, wherein said return oil chamber and said another hydraulic servo acting as an engaging element to be applied for establishing said third gear stage are connected through an oil passage in which is arranged a valve for blocking said oil passage when a throttle opening of an engine connected to said automatic transmission exceeds a predetermined value.

7. A hydraulic servo-mechanism according to claim 6, wherein said band is restrained at one end by an anchor pin and expanded by its own elasticity when said rod is in the retracted position; and wherein a case of said automatic transmission has a support face for supporting an outer circumference of said band over a predetermined range thereby to restrict expansion of said band.

8. A hydraulic servo-mechanism for an automatic transmission according to claim 7, wherein said support face supports said band when said band is expanded for establishing a predetermined gap between an apply side bracket of said band and a leading end portion of said rod when said rod is in the retracted position.

9. A hydraulic servo-mechanism according to claim 1 wherein said rod is disengaged from said apply side bracket in said retracted position.

* * * * *